United States Patent [19]

Haendle

[11] 4,365,269

[45] Dec. 21, 1982

[54] X-RAY DIAGNOSTIC INSTALLATION COMPRISING A SOLID STATE IMAGE CONVERTER

[75] Inventor: Joerg Haendle, Erlangen, Fed. Rep. of Germany

[73] Assignee: Siemens Aktiengesellschaft, Berlin & Munich, Fed. Rep. of Germany

[21] Appl. No.: 273,198

[22] Filed: Jun. 12, 1981

[30] Foreign Application Priority Data

Jul. 11, 1980 [DE] Fed. Rep. of Germany ....... 3026359

[51] Int. Cl.³ ............................................. H04N 5/32

[52] U.S. Cl. .................................... 358/111; 358/152; 358/211; 358/213; 378/99

[58] Field of Search ............... 358/111, 211, 152, 213; 250/416, 313, 314; 280/409

[56] References Cited

U.S. PATENT DOCUMENTS 3,280,253 10/1966 McMaster et al. ................ 358/111
4,123,786 10/1978 Cramer ................................ 358/111
4,158,854 6/1979 Duimker ............................. 358/111

OTHER PUBLICATIONS

Publication *Electronic Design,* 3/15/76, pp. 70–75, Kosonocky et al., "Consider CCDs for a Wide Range of Uses. Existing Charge-Coupled-Device Products Encompass Image Sensors, High-Density Memories and Analog-Signal Processors."

*Primary Examiner*—Robert L. Griffin
*Assistant Examiner*—Edward L. Coles
*Attorney, Agent, or Firm*—Hill, Van Santen, Steadman, Chiara & Simpson

[57] ABSTRACT

An exemplary embodiment includes an image intensifier television chain with an x-ray image intensifier, an optoelectronic image converter and a monitor, and in which the transmission proceeds according to an interlaced method. For the x-ray image intensifier a deflection device is provided which, synchronously with the image scanning frequency generated by a clock pulse generator periodically effects a slight displacement of the x-ray image intensifier output image such that the displacement proceeds in a vertical and in a horizontal direction by half the spacing of the image elements of the image converter, and whereby two successive fields, respectively, are displayed on the monitor displaced corresponding to the displacement of the image intensifier output images.

2 Claims, 1 Drawing Figure

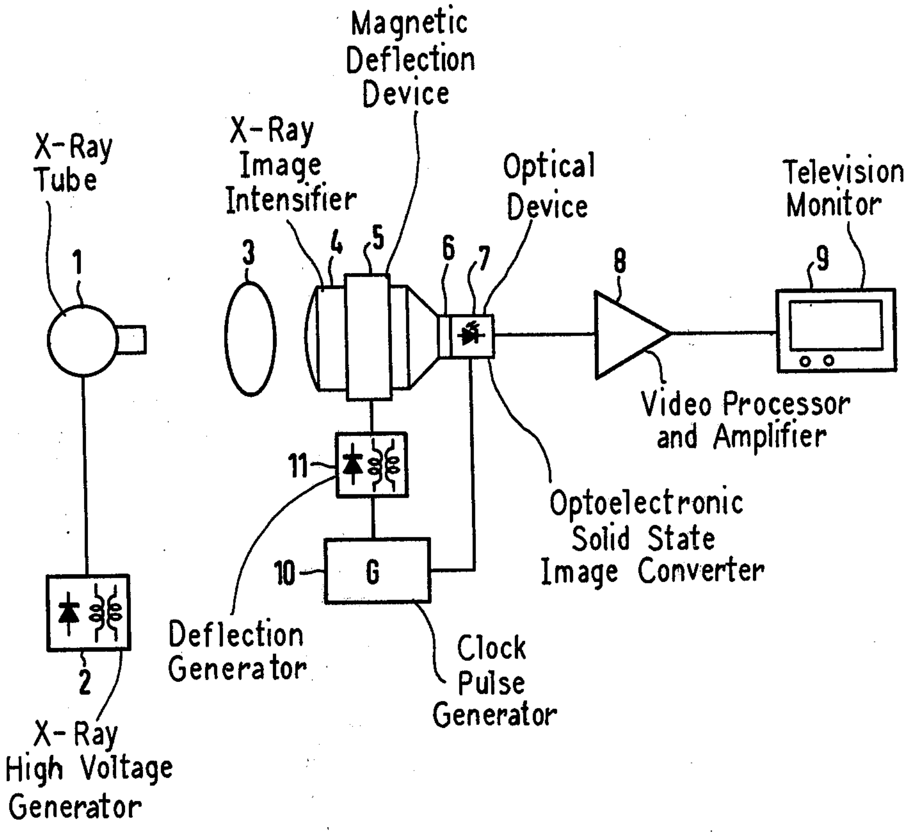
Magnetic Deflection Device
X-Ray Image Intensifier
X-Ray Tube
Optical Device
Television Monitor
1
3
4
5
6
7
8
9
Video Processor and Amplifier
11
Optoelectronic Solid State Image Converter
10
G
Deflection Generator
Clock Pulse Generator
2
X-Ray High Voltage Generator

X-RAY DIAGNOSTIC INSTALLATION COMPRISING A SOLID STATE IMAGE CONVERTER

BACKGROUND OF THE INVENTION

The invention relates to an x-ray diagnostic installation comprising an image intensifier television chain which exhibits an x-ray image intensifier, a television pickup device with an optoelectronic image converter and a monitor, and in which the transmission proceeds according to the interlaced method.

It is generally known to employ television technological means for the observation of an x-ray image. In order to generate the television signal, a video pickup tube has been employed up to the present time, whose output signal is amplified and displayed on a monitor. The camera tube is customarily coupled to the x-ray image intensifier with an optical device whose output image is converted into electrical signals.

Recently, brought about by the advances realized in the semiconductor field, optoelectronic solid state image converters have been proposed instead of the camera tubes. In addition to matrices comprised of photodiodes, recently also charge-coupled (CCD-) image converters have gained increasing significance, which, for example, are described in detail in the publication "Electronic Design", March 15, 1976, at pages 70–75.

Compared with television cameras having video pickup tubes, the television cameras constructed with solid state image converters can be kept smaller. Also, they exhibit a simpler circuit construction which is easy to integrate. However, the limited number of image (or picture) elements proves disadvantageous here. In the case of a video pickup tube, at least in the horizontal direction, the number of image elements can be considered as unlimited. In the vertical direction, the number of image elements corresponds to the number of scanning lines of the television system. By contrast, the number of image elements in the case of a solid state image converter is limited by the number of photodiodes, or charge elements, respectively.

In the case of the known CCD- image converters, a maximum number of 512×512 charge elements is present. If such a CCD- image converter is coupled with an x-ray image intensifier, then a degradation of resolution results as compared with a television installation with a video pickup tube. If, for example, an image intensifier of 17 cm-input diameter is scanned by such a CCD- image converter, a limit of resolution of approximately 1.5 line pairs per mm results.

SUMMARY OF THE INVENTION

The invention proceeds from the object of creating an x-ray diagnostic installation of the type initially cited which, in the case of utilization of a solid state image converter, is distinguished by a high image resolution.

In accordance with the invention, the object is achieved in that the image converter is a solid state image converter and that a deflection device for the x-ray image intensifier is provided, which, synchronously with the vertical or image scanning frequency generated by a clock pulse generator, periodically effects a minor displacement of the x-ray image intensifier output image, and wherein the displacement proceeds in the vertical and in the horizontal direction by half the distance (or spacing) of the image elements of the image converter, and whereby two successive fields (or half images), respectively, are displayed on the monitor corresponding to the displacement. Through this relative displacement of the x-ray image in relation to the image converter, the output image of the x-ray image intensifier is scanned with a resolution which is satisfactorily high.

A storage of the x-ray image with increased image resolution is rendered possible if a memory for the storage of two chronologically successive fields is present, and if means are provided which interlace both memory images with one another during reproduction (or display).

The invention shall be explained in greater detail in the following on the basis of an exemplary embodiment illustrated on the accompanying drawing sheet; and other objects, features and advantages will be apparent from this detailed disclosure and from the appended claims.

BRIEF DESCRIPTION OF THE DRAWING

The single FIGURE is a diagrammatic illustration of an embodiment of the present invention.

DETAILED DESCRIPTION

In the FIGURE, an x-ray diagnostic installation comprising an x-ray tube 1 is illustrated which is operated by an x-ray generator 2. The radiation beam issuing from the x-ray tube 1 passes through a patient 3 and generates an x-ray image on the input fluorescent screen of an x-ray image intensifier 4 which is surrounded by a magnetic deflection device 5. With an optical device 6 the x-ray image intensifier output image is transmitted to an optoelectronic solid state image converter 7 which, for example, can be formed with a matrix of photodiodes or a CCD image converter. The output signal of the image converter 7 is prepared (or processed) and amplified in a video amplifier 8, and displayed on a monitor 9. A clock pulse generator 10 controls the scanning of the image converter 7 and a deflection generator 11, which is connected with the deflection device 5 and controls the latter in such a fashion that the deflection of the electron flow of the x-ray image intensifier 4 proceeds synchronously with the scanning operation of the image converter 7.

For the television pickup of the radiation image impinging on the x-ray image intensifier 4, during the duration of the first television field (or half-image), the deflection device 5 is not energized (or excited), so that the input image of the x-ray image intensifier is imaged on the output viewing screen in a normal, nondisplaced position. The clock pulse generator 10 controls the scanning of the image converter 7 and the synchronization of its output signal with the television standard. The standardized video signal of the image converter 7 is amplified in the video amplifier 8 and reproduced (or displayed) on the monitor 9.

During the duration of the scanning of the second television field (or half image), the deflection device 5 is activated by the deflection generator 11 which receives its control pulses from the clock pulse generator 10. As a consequence of this, the electron beams of the x-ray image intensifier 4, in addition to the imaging by the conventional electron optics, are slightly laterally deflected, so that the input image now appears on the outlet fluorescent screen, vertically as well as horizontally displaced by half the spacing of the image elements of the image converter 7. Controlled by the clock pulse generator 10, this image is picked up by the image converter 7. The switching-over of the deflection expediently proceeds in the blanking interval between the two television fields (or half images).

This picked-up second television field (or half image) is displayed according to the interlaced method. This signifies that the vertically displaced image is reproduced (or displayed) between the lines of the first television field (or half image) in position-correct fashion corresponding to the displacement of the image intensifier output images. The horizontal displacement of the picked-up image is taken into consideration by virtue of the fact that the output signal of the image converter 7, in relation to the synchronization pulse of the video signal, is furthermore delayed by half the chronological scanning interval between adjacent image elements of the solid state image converter matrix. As a consequence of this, the second television field (or half image) is displaced vertically and horizontally, so that successive television fields (or half images) are displaced relative to one another in the correct amount, in order that the two chronologically successive television fields are reproduced (or displayed) in a positionally-correct fashion as a television frame (or picture) on the monitor 9.

Instead of the magnetic deflection, an electrostatic deflection can be employed if additional electrodes are applied on or in the x-ray image intensifier 4, which electrodes can slightly deflect the electronic image in the described fashion.

As an optical device 6 for coupling the image converter 7 to the x-ray intensifier 4, expediently a fiber optics is employed which corresponds in its density of elements and dimensions to the solid state image converter.

In the case of the described x-ray diagnostic installation, the dimensions and the resolution are determined almost only by the x-ray image intensifier, and it is distinguished by a high image resolution.

It will be apparent that many modifications and variations may be effected without departing from the scope of the novel concepts and teachings of the present invention.

I claim as my invention:

1. An x-ray diagnostic installation comprising: an image intensifier television chain which exhibits an x-ray image intensifier, a television pickup device with an optoelectronic image converter and a monitor, and in which the transmission proceeds according to the interlaced method, a clock pulse generator for defining a scanning rate, the image converter (7) being a solid state image converter controlled for scanning in accordance with said scanning rate, and a deflection device (5) for effecting a deflection of an output image of the x-ray image intensifier (4) synchronously with the scanning rate of said clock pulse generator (10), and operable for periodically effecting a slight displacement of the x-ray image intensifier output image such that the displacement proceeds in a vertical and in a horizontal direction by half the spacing of the image elements of the image converter (7), and means whereby successive fields are displayed on the monitor (9) with a periodic displacement corresponding to the periodic displacement of the output images of the x-ray image intensifier.

2. An x-ray diagnostic installation comprising: an image intensifier video chain which includes an image intensifier having an optical output and operable for producing an output optical image at the location of the optical output, a video pickup device with an optoelectronic image converter coupled with the optical output of the x-ray image intensifier and having an array of image sensing elements responsive to respective image elements of an output optical image at the optical output, a video monitor coupled with the optoelectronic image converter for displaying successive fields in accordance with image elements of output optical images received by the image sensing elements of the image converter, a clock pulse generator coupled with said optoelectronic image converter for defining a field scanning rate thereof, the image converter (7) being a solid state image converter controlled for scanning of image elements of successive output optical images of the image intensifier during successive field scanning intervals corresponding to said field scanning rate, and a deflection system (5) coupled with said x-ray image intensifier for effecting periodic deflections of the optical output of the x-ray image intensifier (4) synchronously with the field scanning rate defined by said clock pulse generator (10), and operable for periodically effecting successive displacements of the image intensifier optical output each corresponding to a fraction of the spacing of the image sensing elements of the solid state image converter (7), and means for coupling the solid state image converter with said video monitor (9) such that successive fields from the solid state image converter (7) are displayed on the monitor (9) with successive displacements corresponding to the successive displacements of the optical output of the image intensifier to provide a display with higher resolution than that corresponding to the spacing between image sensing elements of the solid state image converter.

* * * * *